US009993058B2

(12) United States Patent
Krenik

(10) Patent No.: US 9,993,058 B2
(45) Date of Patent: Jun. 12, 2018

(54) POSITIONING SYSTEM AND METHODS FOR USE WITH AUTOMATED HAIR CUTTING SYSTEMS

(71) Applicant: Matthew W. Krenik, Garland, TX (US)

(72) Inventor: Matthew W. Krenik, Garland, TX (US)

( * ) Notice: Subject to any disclaimer, the term of this patent is extended or adjusted under 35 U.S.C. 154(b) by 353 days.

(21) Appl. No.: 14/525,998

(22) Filed: Oct. 28, 2014

(65) Prior Publication Data

US 2015/0040934 A1 Feb. 12, 2015

Related U.S. Application Data

(63) Continuation-in-part of application No. 14/156,817, filed on Jan. 16, 2014.

(60) Provisional application No. 61/901,093, filed on Nov. 7, 2013, provisional application No. 61/753,072, filed on Jan. 16, 2013, provisional application No. 61/843,094, filed on Jul. 5, 2013, provisional application No. 61/820,015, filed on May 6, 2013.

(51) Int. Cl.

| | |
|---|---|
| ***G06F 19/00*** | (2018.01) |
| ***A45D 24/36*** | (2006.01) |
| ***B26B 29/06*** | (2006.01) |
| ***B26B 19/38*** | (2006.01) |
| *A45D 7/00* | (2006.01) |

(52) U.S. Cl.

CPC ............ *A45D 24/36* (2013.01); *B26B 19/388* (2013.01); *B26B 19/3826* (2013.01); *B26B 29/06* (2013.01); *A45D 2007/007* (2013.01)

(58) Field of Classification Search

USPC .............................................. 132/200; 83/74

See application file for complete search history.

(56) References Cited

U.S. PATENT DOCUMENTS 3,054,183 A 9/1962 Zucker
3,413,985 A * 12/1968 Dlouhy .................. A45D 44/06 132/213

(Continued)

FOREIGN PATENT DOCUMENTS

FR 2964023 A1 3/2012
GB 2462812 A 2/2010

*Primary Examiner* — Kidest Bahta
(74) *Attorney, Agent, or Firm* — Richard G. Eldredge; Eldredge Law Firm

(57) ABSTRACT

Embodiments of positioning systems and methods for use with grooming systems are disclosed herein. One embodiment of a grooming system comprises a moveable grooming device; a positioning device, and a system interface for determining positioning of the moveable grooming device relative to the positioning device. The positioning device comprises a frame having a front, a first side, and a second side; a plurality of frame supports; and a plurality of positioning interfaces. The moveable grooming device comprises at least one sensor for interfacing with the plurality of positioning interfaces. The system interface is configured to interface the plurality of positioning interfaces with the at least one positioning sensor to establish an origin position of the at least one sensor and moveable grooming device; compute a plurality of positioning ranges; and select at least two positioning ranges for calibrating one or more positions of the moveable grooming device.

20 Claims, 5 Drawing Sheets

(56) References Cited

U.S. PATENT DOCUMENTS

| | | | | | |
|---|---|---|---|---|---|
| 3,536,079 | A * | 10/1970 | Dlouhy | A45D 44/06 | 132/200 |
| 4,279,594 | A * | 7/1981 | Rigutto | A61B 1/253 | 433/31 |
| 4,602,542 | A * | 7/1986 | Natrasevschi | B26B 19/00 | 132/214 |
| 6,497,043 | B1 * | 12/2002 | Jacobsen | B26B 21/40 | 132/200 |
| 6,973,931 | B1 * | 12/2005 | King | A41G 5/0086 | 132/201 |
| 7,962,192 | B2 * | 6/2011 | Bodduluri | A61B 17/32053 | 600/407 |
| 2004/0004559 | A1 | 1/2004 | Rast | | |
| 2007/0031217 | A1 * | 2/2007 | Sharma | B25J 5/007 | 414/222.08 |
| 2008/0114375 | A1 * | 5/2008 | von Jako | A61B 34/20 | 606/130 |
| 2009/0303320 | A1 | 12/2009 | Davis | | |
| 2010/0031217 | A1 * | 2/2010 | Sinha | G06F 17/5072 | 716/122 |
| 2011/0018985 | A1 * | 1/2011 | Zhu | A45D 44/00 | 348/61 |
| 2012/0060847 | A1 * | 3/2012 | Stratton | A61B 19/203 | 128/845 |
| 2012/0234146 | A1 * | 9/2012 | Lakin | B26B 19/00 | 83/76.2 |
| 2012/0320180 | A1 * | 12/2012 | Binder | A45D 26/00 | 348/77 |
| 2013/0021460 | A1 * | 1/2013 | Burdoucci | A45D 44/005 | 348/77 |

* cited by examiner

POSITIONING SYSTEM AND METHODS FOR USE WITH AUTOMATED HAIR CUTTING SYSTEMS

CROSS REFERENCE TO RELATED APPLICATION

This application claims priority to U.S. Provisional Application Ser. No. 61/901,093, filed by Matthew W. Krenik on Nov. 7, 2013 and entitled "Positioning Methods for Automated Hair Cutting System", and is a continuation-in-part of U.S. patent application Ser. No. 14/156,817, filed by Matthew W. Krenik on Jan. 16, 2014, entitled "Positioning Device for Automated Hair Cutting System", which claims priority to the following: U.S. Provisional Application Ser. No. 61/753,072, filed by Matthew W. Krenik on Jan. 16, 2013 and entitled "Positioning Device for Automated Hair Cutting System"; U.S. Provisional Application Ser. No. 61/843,094, filed by Matthew W. Krenik on Jul. 5, 2013 and entitled "Positioning System and Techniques for Automated Hair Cutting System"; and U.S. Provisional Application Ser. No. 61/820,015, filed by Matthew W. Krenik on May 6, 2013 and entitled "Enhanced Positioning Device and Method for Automated Hair Cutting System," all of which are commonly owned with this application and the entire contents of each are incorporated herein by reference.

TECHNICAL FIELD

The present disclosure relates generally to grooming systems and methods, and more specifically, to a positioning system and method for determining positioning and positioning ranges used in conjunction with an automated system, such as an automated hair cutting system.

BACKGROUND

International patent application number PCT/US12/70856, filed by Matthew W. Krenik on Dec. 20, 2012, entitled "Automated Hair Cutting System and Method of Operation Thereof" (hereinafter "Krenik '856"), provides a description of automated hair cutting systems. U.S. patent application Ser. No. 14/143,469, filed by Matthew W. Krenik on Dec. 30, 2013, entitled "Hair Cutting Device for Automated Hair Cutting System", provides descriptions and embodiments of hair cutting devices for use in automated hair cutting systems.

SUMMARY

One embodiment of a positioning system for use with an automated grooming system, such as a hair cutting system is disclosed herein. The positioning system comprises a frame. The frame comprises at least a front, and a first side coupled to the front, and a second side coupled to the front opposite the first side, and a plurality of frame supports. A plurality of positioning interfaces are positioned along the first side and the second side. The positioning system further comprises at least one sensor for interfacing with the plurality of positioning interfaces.

In another embodiment, a method for dynamic positioning a moveable component of an automated grooming system is disclosed. The method comprises interfacing a plurality of positioning interfaces with at least one positioning sensor, the plurality of positioning interfaces located on a frame and the at least one sensor positioned on the moveable component of the grooming system; establishing an origin position of the at least one sensor and moveable component of the grooming system relative to the frame; computing a plurality of positioning ranges between the plurality of positioning interfaces on the frame and the at least one sensor; and selecting at least two of the plurality of positioning ranges for calibrating one or more positions of the moveable component as the moveable component moves relative to the frame.

A grooming system, comprising a positioning device. The positioning device comprises a frame, said frame comprising at least a front, and a first side coupled to said front, and a second side coupled to said front opposite said first side; a plurality of frame supports; and a plurality of positioning interfaces positioned along said first side and said second side. The grooming system further comprises a moveable grooming device comprising at least one sensor for interfacing with said plurality of positioning interfaces; and a system interface for determining positioning of said moveable grooming device relative to said positioning device, said system interface configured to: interface said plurality of positioning interfaces with said at least one positioning sensor; establish an origin position of said at least one sensor and moveable grooming device relative to said frame; compute a plurality of positioning ranges between said plurality of positioning interfaces on said frame and said at least one sensor; and select at least two of said plurality of positioning ranges for calibrating one or more positions of said moveable grooming device as said moveable grooming device moves relative to said frame.

DETAILED DESCRIPTION

Embodiments of the present disclosure include positioning systems and methods for use with automated hair cutting systems that utilize multiple positioning ranges to determine the position and/or orientation of a hair cutting device relative to the head of a user receiving a haircut and in which determining which positioning ranges to apply is made through a selection criteria. A positioning range is the distance from a positioning interface to a positioning sensor and may be determined through analysis of positioning signal propagation times or through other techniques. A selection criteria for the selecting of positioning ranges may include analysis of positioning signal strength, the subtended angle of multiple positioning ranges that may be used in conjunction, the sensitivity of a computed position to small errors in the measurement of positioning ranges, the likelihood that a given positioning range may be obstructed, past use of positioning ranges for determining a position and/or orientation of a hair cutting device relative to the head of a user, and other factors. Further embodiments of this invention may include automated hair cutting systems that may change the positioning ranges used for determining position and/or orientation of a hair cutting device as a hair cutting device is moved about the head of a user and that may compensate for variations or inaccuracies in positioning ranges that may lead to differences in the computed position and/or orientation of a hair cutting device relative to the head of a user before and after some or all of the positioning ranges used are changed. The compensation may include the computation and application of a translational offset that may be applied when determining position and/or orientation of a hair cutting device, or may involve other mathematical computations that provide alternative compensations for some embodiments.

Figure 1:
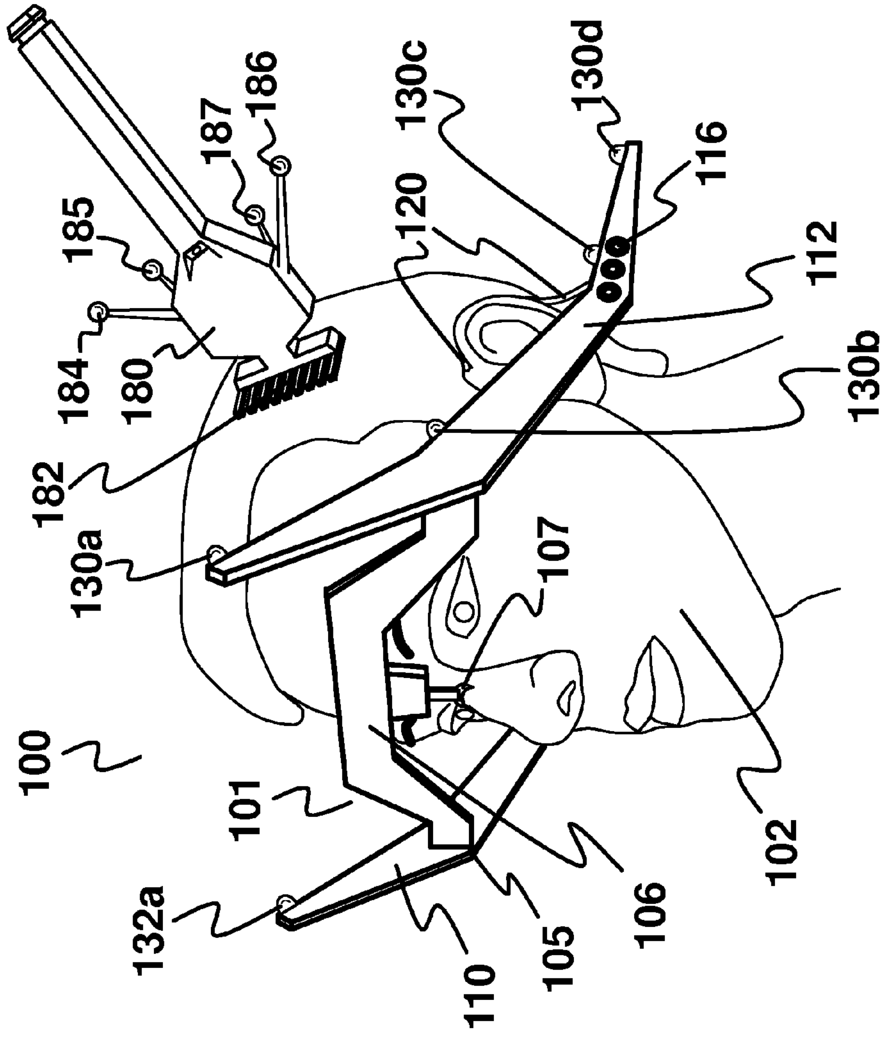
FIG. 1 is a perspective view of an automated hair cutting system having a positioning device according to the present disclosure.

Referring now to FIG. 1, there is shown one embodiment of a positioning system 100 according to the present disclosure. Positioning system 100 comprises a positioning device 101 shown placed on the head of a user 102. Positioning device 101 comprises a frame 105 which may comprise a front frame 106, right side frame 110, and left side frame 112. The frame 105 may further comprise frame supports and a plurality of positioning interfaces. The plurality of positioning interfaces may vary in certain embodiments. The plurality of positioning interfaces 130*a*-130*d* and 132*a*-132*d* may comprise a plurality of left side positioning interfaces 130*a*-130*d* and right side positioning interfaces 132*a*-132*d*. Left side positioning interfaces 130 may include left front positioning interface 130*a*, left second positioning interface 130*b*, left third positioning interface 130*c*, and left rear positioning interface 130*d*. Right side positioning interfaces 132 may comprise right front positioning interface 132*a*, right second positioning interface 132*b*, right third positioning interface 132*c*, and right rear positioning interface 132*d*. The positioning interfaces of positioning device 101 communicate via positioning signals with at least one positioning sensor, first positioning sensor 184. Additional positioning sensors may include second positioning sensor 185, third positioning sensor 186, and fourth positioning sensor 187. The positioning sensors may be coupled onto on hair cutting device 180, wherein the interaction between the positioning sensors and the plurality of positioning interfaces 130 and 132 enable an automated hair cutting system, such as the system described in Krenik '856, to determine the position and/or orientation of a hair cutting device 180 relative to positioning device 101. The plurality of positioning interfaces 130 and 132 may produce signals that are received by positioning sensors on hair cutting device 180, but other embodiments may comprise signals which are generated on the hair cutting device 180 and received by the plurality of positioning interfaces 130 and 132. Other embodiments may employ signals both sent and received on both positioning device 101 and hair cutting device 180. Positioning interfaces and positioning sensors may contain speakers, microphones, transducers, antennas, lights, photo-sensors, cameras, and/or other elements capable of generating or receiving signals, or other communication elements. While positioning device 101 includes eight positioning interfaces and hair cutting device 180 includes four positioning sensors, other embodiments may employ a varying number of both positioning interfaces and positioning sensors, in various alternate locations.

The frame supports may include ear support holes 116, ear supports 120, and a nose support 107, supporting the front frame 106 on user's 102 nose. Ear supports 120 hook over the ears of user 102 from the back of the ear, but other embodiments may comprise ear supports 120 that hook over the ears from the front or in which ear supports contact the ears and provide support without hooking over the tops of the ears (that is, ear supports that contact the inside regions of the ear, or even other portions of the face or head of a user 102).

Positioning signals are used to determine the positioning of cutter head 182 on hair cutting device 180 relative to the scalp of user 102 where hair may be collected. Knowledge of the position and orientation of hair cutting device 180 (through use of first positioning sensor 184, second positioning sensor 185, third positioning sensor 186, and fourth positioning sensor 187 and positioning interfaces on positioning device 101) may signal that cutter head 182 is substantially contacting the scalp of user 102 and hair has been collected in cutter head 182; or user 102 or another person operating hair cutting device 180 may press a button on hair cutting device 180 or provide a verbal or other indication that hair cutting device 180 is substantially contacting the scalp of user 102 and hair has been collected in cutter head 182; or a touch sensor, proximity sensor, or other sensor may be used on the base of cutter head 182 that provides a signal when it is substantially in contact with the scalp. Once a signal indicates that cutter head 182 has contacted the scalp and positioning signals have substantially provided the position of cutter head 182 on the scalp, the hair collected in cutter head 182 may be extended for cutting. (Other positioning and signaling techniques may be used including, e.g., accelerometers, gyroscopes, motion sensors, or other sensors suitable for measuring position, orientation, or motion.) Hair cutting device 180 may then be lifted away from the scalp so that hair collected in cutter head 182 slides through cutter head 182 in a combing action. As hair cutting device 180 is lifted away from the scalp its position and orientation continue to be monitored so that the length of hair collected in cutter head 182 may be determined. Once hair cutting device 180 is positioned so that hair collected in cutter head 182 is at a desired length, cutter head 182 may be actuated so that the hair collected in cutter head 182 is cut to the desired length.

Hair cutting device 180 may use a wide variety of cutter heads 182 to accommodate a variety of ways hair may be collected and cut. Some cutter heads may include modes of operation or work with auxiliary combs (see the references cited above) so that pressure or friction may be applied to hair so that it may be more easily extended and manipulated. And some cutter heads may utilize cutting edges that allow hair collected in a cutter head to be partially cut, so that some of the collected hair is cut and other hair in the cutter head remains uncut. For example, if a cutter head includes cutting blades on cutter head teeth and cuts hair in the manner of common scissors blades that come together at an angle; then a partial cutting stroke of a cutter head may only cut some of the collected hair, in the same fashion that a common pair of scissors may be partially closed so that some, but not all, of the hair between the scissor's blades is cut. Many possible embodiments of cutter heads that may have modes for partial cutting stroke actuation, or special actuation modes that only cut some of the hair contained in them are possible. Styling hair may involve thinning hair in some regions on the head of a user, enabling a user to collect and cut only a portion of hair. A hair cutting device in an automated hair cutting system may utilize partial cutting strokes, as noted above, so that hair is thinned in a desirable way and the partial cutting strokes used may be applied based on the position and orientation of a hair cutting device 180 so that consistent and desirable thinning of hair may be performed. Use of multiple partial cutting strokes of a cutter head in the course of extension of a region of hair on the head of a user may allow the region of hair to be tapered in thickness in desirable ways. Hair thinning and/or tapering may be performed in a deterministic way so that consistent and substantially refined results are achieved. Or alternatively, hair thinning and/or tapering may be performed with some element of randomness to provide hair styles involving a more ragged or random sense of fashion.

In addition to use of partial cutting strokes for hair thinning or tapering, some embodiments of cutter heads may utilize serrated blades or specially formed blades that only cut some of the hair collected in them (for example, in the fashion of a common hair thinning shear). When special cutter heads may be needed for thinning hair, a hair cutting device with interchangeable cutter heads may enable hair cutting with a cutter head designed for complete cutting of hair and hair thinning or tapering may be undertaken with cutter heads specially designed for that purpose. Some embodiments of hair cutting devices may allow accessories to be attached to them so that accessories designed for thinning, tapering, shaping, or other purposes may utilize position and/or orientation information available to a hair cutting device operating in an automated hair cutting system. Such accessories may attach to, be powered, interface with, and possibly be controlled by a hair cutting device.

Collection, extension, and cutting of hair may also involve a degree of randomness or tapering in the course of a cutting action of cutter head 182. Some hair styles may include a "feathered" texture to cut hair and may avoid use of complete and abrupt cut lines in hair. An automated hair cutting device 180 may achieve such a result by reciprocating a cutter head 182 through a course of repetitive partial cutting strokes within a controlled range of the desired length to which a region of hair is to be cut. Such a technique for feathering hair may culminate in a substantially complete cutting stroke so that none of the collected hair in cutter head 182 is left undesirably long. In such a fashion, cut hair may vary slightly in actual cut length over some acceptable measurement interval about its optimal desired length, resulting in an element of smoothing or feathering of hair so that it produces a desirable result. The length over which such reciprocating partial cutting strokes may occur may be controlled by hair cutting device 180 and may be adaptive to desired hair styles, user preferences, and other factors. Various effects may also be achieved as a result of the amount of hair collected in a cutter head 182 and how the hair is extended. In particular, a user operating hair cutting device 180 may be directed by an automated hair cutting system including a computing device to orient hair cutting device 180 in certain ways for cutting hair on certain areas of their head to obtain desirable results as hair is extended so that hair collected in cutter head 182 is favorably positioned for cutting for either a complete and abrupt cutting stroke, repetitive partial cutting strokes, thinning of hair, tapering of regions of hair, or other possible hair cutting or styling operations.

Figure 2:
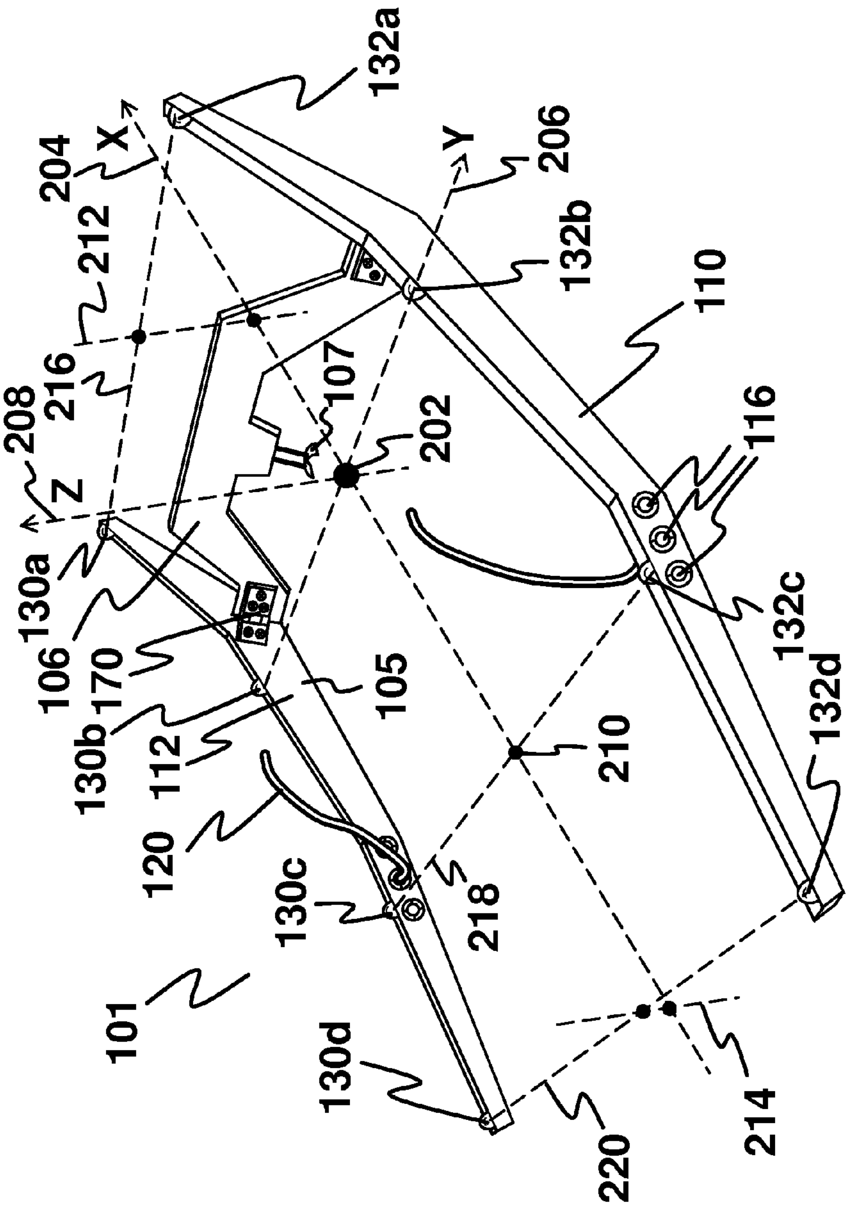
FIG. 2 is a perspective view of the positioning device of FIG. 1.

FIG. 2 is a perspective view of positioning device 101, illustrating a coordinate system which may be used in conjunction with positioning device 101. As shown in FIG. 2, hinges 170 may mechanically couple front frame 106 to left side frame 112 and right side frame 110. Hinges 170 allow positioning device 101 to be folded for convenient storage and also allow users with different head widths to be accommodated. In FIG. 2, Y-axis 206 is defined by a line passing through left second positioning interface 130*b* and right second positioning interface 132*b*; X-axis 204 is defined by a line passing through an origin 202, defined as the center point on Y-axis between left second positioning interface 130*b* and right second positioning interface 132*b*, and a center point 210 on a line between left third positioning interface 130*c* and right third positioning interface 132*c*; and Z-axis 208 is defined by a line passing through origin 202 and extending substantially vertically and orthogonal to both X-axis 204 and Y-axis 206. Origin 202 is defined as the point at which the coordinate axes intersect and coordinates along the axes (X-axis 204, Y-axis 206, and Z-axis 208) may be defined to a zero value at origin 202. Positive coordinates may extend on the axes as shown in FIG. 2 by the arrows on the axes. X-axis 204 may take its positive direction forward (in the direction a user 102 wearing positioning device 101 would look straight forward); Y-axis 206 may take its positive direction substantially to the right; and Z-axis may take its positive direction substantially vertically upward. The coordinate system defined by X-axis 204, Y-axis 206, and Z-axis 208 allows points, lines, vectors, shapes, and possibly other geometric structures on and around the head of a user 102 wearing positioning device 101 to be defined by coordinates relative to X-axis 204, Y-axis 206, and Z-axis 208 and these coordinates may represent physical measurements from origin 202 along X-axis 204, Y-axis 206, and Z-axis 208 represented in millimeters, centimeters, inches, or other convenient standards of measurement.

Positioning device 101 may be constructed using flexible materials such that positioning device may conform to various head shapes for various users. However, the flexible materials may also cause positioning device 101 to deform over repeated use and normal wear and tear. The cited references noted above provide a description of how positioning device 101 may be calibrated to the head and scalp of a user 102 so that positions on and around the head of a user 102 may be located in spite of deformation of positioning device 101. Multiple approaches for calibration of the sensor interface positions of positioning device 101 and other possible positioning devices are possible. The embodiment of positioning device 101 as shown in FIG. 2 enables calibration of the sensor interface positions. As front frame 106 is visible to user 102 wearing it and looking into a mirror, user 102 may be prompted to adjust positioning device 101 so that front frame 106 is centered and level. This may be accomplished by making small adjustments to ear supports 120, adjusting positioning device 101 so that nose support 107 is properly centered and positioned, and other possible adjustments. Once the adjustment of positioning device 101 is complete so that it appears correctly to user 102, some embodiments may use a camera to capture a picture of user's 102 face so that additional fine adjustments may be determined by image analysis and applied to a calibration algorithm so that the position of the positioning interfaces of positioning device may be even more accurately calibrated. The camera may be incorporated into a various components of an automated hair cutting system, such as, e.g. the automated hair cutting system of Krenik '856. Likewise, the camera may be incorporated onto positioning device 101 (such a camera may take a picture of a reflection of user 102 in a mirror) or may be any other electronic camera that may be interfaced to an automated hair cutting system so that images it produces may be analyzed. Once alignment of front frame 106 is complete, some embodiments may use the positioning sensors on hair cutting device 180 with positioning device 101 to measure the distance from the tops of the ears (the bottoms of the ears or other suitable reference points may also be used) of user 102 to left third positioning interface 130*c* and right third positioning interface 132*c* so that calibrations of any vertical deformations of left side frame 112 and right side frame 110 may be accounted for. Hair cutting device 180 may also be used to measure the distance between left rear positioning interface 130*d* and right rear positioning interface 132*d* (as shown in FIG. 2, e.g., the length of line 220) so that flexing of left side frame 112 and right side frame 110 inward or outward (closer or nearer to the head of user 102) may also be accounted for in calibration algorithms.

The use of reference points, measurements of positioning device 101 while it is being worn by user 102, and the use of mathematical techniques for calibration will not be further described in this patent application. Hence, the coordinate axes and positioning interface positions of positioning device 101 will be taken as known for the descriptions provided in this patent application. After consideration of the prior art and the paragraphs above that such calibrations, adjustments, etc. as are needed to calibrate a positioning device 101 for use with a user 102 may be undertaken so that the coordinate axes and positioning interface positions of positioning device 101 may be determined with adequate precision. Hence, taking the coordinate axes and positioning interface positions of positioning device 101 as known for this patent application results in no loss of utility, accuracy, generality, or other factors.

Coordinate positions relative to the coordinate axes in FIG. 2 may be taken in a conventional manner. For example, the X-axis 204 coordinate of left front positioning interface 130*a* may be taken as the coordinate value along the X-axis 204 where a line 212 parallel to Z-axis 208 and intersecting the midpoint of a line 216 connecting left front positioning interface 130*a* and right front positioning interface 132*a* intersects X-axis 204. Alternatively, the Z-axis 208 coordinate of right rear positioning interface 132*d* may be taken as the distance along a line 214 parallel to Z-axis 208 and between a point on line 214 intersecting the midpoint of a line 220 connecting right rear positioning interface 132*d* and left rear positioning interface 130*d* and the intersection point of line 214 with the X-axis 204. Other coordinate positions of the various positioning interfaces of positioning device 101 may be similarly determined. Other possible coordinate systems may be defined relative to positioning device 101, such as coordinate systems that make use of rectilinear coordinates defined as orthogonal coordinate systems of various orientations and translations relative to positioning device 101, coordinate systems using axes that are not all orthogonal to each other, coordinate systems employing polar coordinates, coordinate systems employing cylindrical coordinates, combinations of coordinate systems, non-linear coordinates, coordinates defined along curves, and many other coordinate systems may be applied for the purposes of an automated hair cutting system utilizing a positioning device such as positioning device 101 or other possible positioning devices. Hence, the coordinate positions of positioning interfaces, points on or around a user's head, a user's facial features, features in a user's hair (such as hair parts, where jewelry is worn in hair, the location of hair dye, or other features), and other points or features of interest may be made with any of a wide range of coordinate systems defined relative to a positioning device such as positioning device 101.

Figure 3:
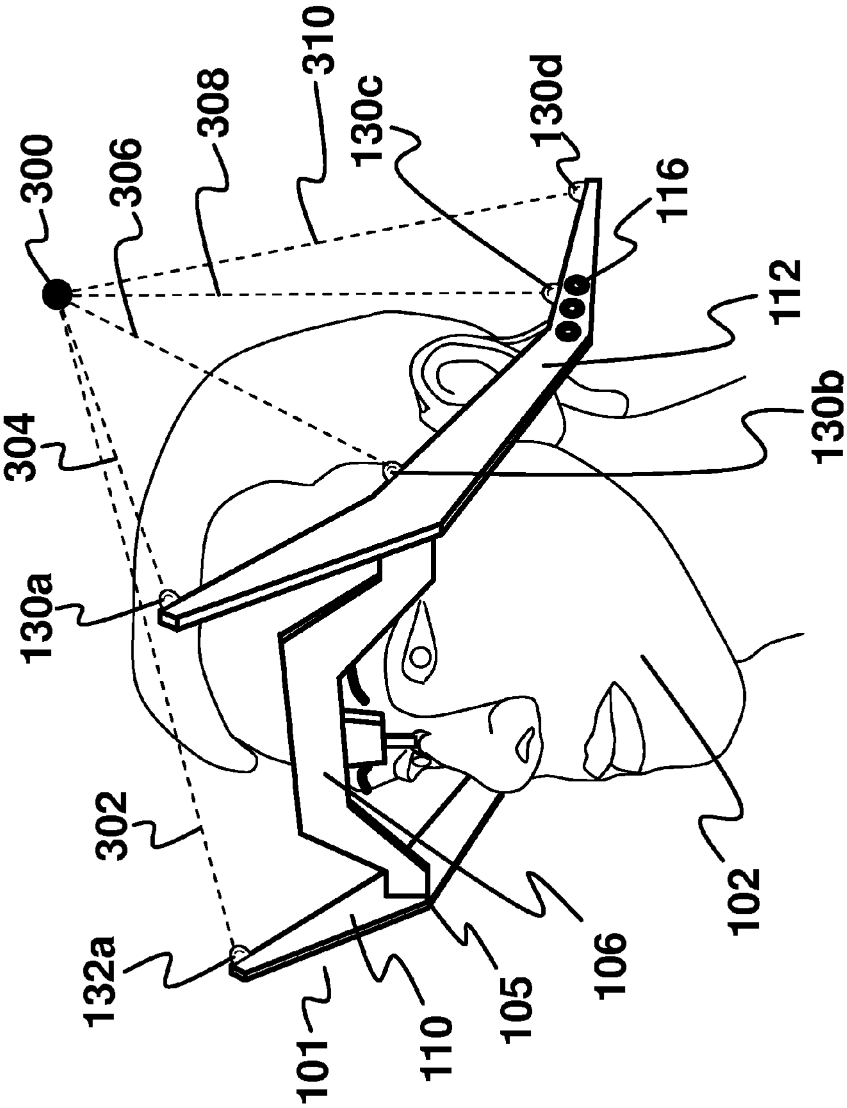
FIG. 3 is an environmental view of the positioning device of FIG. 1 shown as worn by a user, and illustrating aspects of positioning ranges according to present disclosure.

FIG. 3 shows user 102 wearing positioning device 101 and shows a single positioning sensor 300. Positioning sensor 300 is shown in FIG. 3 as a black dot for simplicity, but actual embodiments of positioning sensor 300 may embody a microphone, sensor, camera, infrared light sensor, antenna, or other possible sensors. Embodiments of automated hair cutting systems including positioning devices and hair cutting devices would normally have positioning sensors 300 incorporated into or attached onto hair cutting devices (such as hair cutting device 180), but the embodiment shown in FIG. 3 illustrates how positioning ranges may be used to compute the position of a positioning sensor 300, from which, the position and orientation of a hair cutting device 180 containing multiple positioning sensors may be computed. FIG. 3 shows five positioning ranges. First positioning range 302 extends from right front positioning interface 132*a* to positioning sensor 300, second positioning range 304 extends from left front positioning interface 130*a* to positioning sensor 300, third positioning range 306 extends from left second positioning interface 130*b* to positioning sensor 300, fourth positioning range 308 extends from left third positioning interface 130*c* to positioning sensor 300, and fifth positioning range 310 extends from left rear positioning interface 130*d* to positioning sensor 300. Additional positioning ranges may be used in other embodiments. Each positioning range shown in FIG. 3 represents a measured distance that may be utilized for computing the position and/or orientation of a hair cutting device. Positioning ranges may be measured in various ways, differing according to the type of positioning signals used for a given embodiment of a positioning device and positioning sensors. Time of flight measurements of ultrasound signals, sound signals, sonar signals, light signals, infrared light signals, laser light signals, microwave signals, radio frequency signals, radar signals, and other types of signals for which a measurement of propagation time of a signal provides an indication of distance may be used for some embodiments of positioning devices and positioning sensors. Other embodiments may use cameras for positioning sensor 300 and may use observation of focus in observing targets at the positions of positioning interfaces on positioning device 101. If a binocular camera is used for positioning sensor 300, triangulation (parallax) may be used to compute positioning ranges. Still other embodiments may use laser range finders or any other type of range measurement device to determine positioning ranges. Other embodiments may use positioning signals emanating from positioning interfaces mounted on a hair cutting device that propagate to sensors mounted on a positioning device. Accordingly, positioning signals may propagate either from a positioning device to a hair cutting device, from a hair cutting device to a positioning device, or even in both directions.

If the positions of the positioning interfaces shown in FIG. 3 are known relative to a coordinate system such as the coordinate system formed by X-axis 204, Y-axis 206, and Z-axis 208 shown in FIG. 2, and the lengths of the positioning ranges shown in FIG. 3 are known, then the position of positioning sensor 300 may be computed. In fact, the position of positioning sensor 300, as shown in FIG. 3, is over-determined as only four positioning ranges would normally be needed to compute the position of positioning sensor 300 and five positioning ranges are available. While FIG. 3 illustrates four positioning ranges, some embodiments may require only three positioning ranges to compute the position of positioning sensor 300, since three positioning ranges would allow the position of positioning sensor 300 to be computed to two possible positions, either the position shown in FIG. 3 above user's 102 head or an opposite position below user's 102 head. As the "opposite" positions for a computed position of positioning sensor 300 is often an absurd position (such as inside user's 102 head, under user's 102 chin, inside user's 102 chest, outside the range of the positioning signals being used, etc.), some embodiments of automated hair cutting systems may perform some or all of their positioning sensor position computations with only three positioning ranges. And, for cases where both possible positions of a positioning sensor are possible real positions for a positioning sensor, some embodiments may employ a fourth positioning range for those computations or may make use of other information such as recently prior positions of the positioning sensor that were well-established and not ambiguous. If directional transmitters are used as positioning interfaces on positioning device 101, some embodiments may use signal strength measurements at positioning sensor 300 to rule out one of two possible computed positions for positioning sensor 300. For example, if positioning sensor 300 were below positioning device 101 instead of above as shown, and directional transmitters favoring upward signal transmission were used on positioning device 101, the signal strength of positioning signals received at positioning sensor 300 may be very noticeably weak in comparison to an expected signal power level.

As multiple positioning ranges may be available from which the position of a positioning sensor 300 may be computed, a criteria may be used to select which positioning ranges to use. From the set of available positioning ranges, including first positioning range 302, second positioning range 304, third positioning range 306, fourth positioning range 308, and fifth positioning range 310, with the assumption that accuracy of the length of each positioning range is substantially equal; then the positioning ranges used may be selected such that a substantially maximum solid angle is subtended between the positioning ranges. A criteria of a maximum subtended angle of the positioning ranges may provide a result for some embodiments as small inaccuracies in the positions of positioning interfaces and in the length of positioning ranges may generally lead to smaller errors in the computed position of positioning sensor 300 if a substantially larger subtended angle between the positioning ranges exists for the positioning ranges selected. For some embodiments, a simplified implementation of a positioning range selection criteria may be applied. For example, positioning ranges that extend to the positioning interfaces on the far corners of a positioning device may simply be favored (that is, favor positioning ranges that extend to left front positioning interface 130*a*, left rear positioning interface 130*d*, right front positioning interface 132*a*, or right rear positioning interface 132*d*) as they will generally subtend larger angles. Other such simplified criteria for positioning range selection may also be developed.

Selecting positioning ranges for position computations in an automated hair cutting system is similar in many ways to selecting ranges used for position computation in satellite navigation systems such as a Global Positioning System (GPS). In satellite navigation systems, Dilution of Precision (DOP) refers to analysis of the geometry and other factors in a position computation that limit precision. Systems and approaches for reducing DOP and improving positioning accuracy in satellite navigation systems may also be used in conjunction with an automated hair cutting system.

Various methods and criteria may be used for selecting which positioning ranges to use. For example, sensitivity analysis may be undertaken in which the resulting change in the computed position of sensor 300 is determined as a function of a small measurement error in one of the positioning ranges. Such a computation may be undertaken for all available ranges and those with the lowest sensitivity in resulting position error may be favored. Another alternative would be to compute the position of sensor 300 based on computation of every subset of three possible positioning ranges (from the five ranges available) and average the results to compute a final computed position. For such a technique, voting techniques, elimination of outliers, or other common techniques may be used in favor to or in addition to simple averaging.

Positioning ranges in some embodiments may be selected using analysis of signal strength of positioning signals received at positioning sensor 300. Some embodiments of hair cutting devices may apply signal processing of positioning signals that includes measuring signal strength directly, some embodiments may utilize gain control algorithms and/or automatic gain control and may determine signal strength by analyzing the gain level used to process a positioning signal, and other approaches for received positioning signal strength determination may also be used in some embodiments. If some positioning signals arriving at positioning sensor 300 are weak, it may be assumed that those signals have been partially blocked (by hair, a user's 102 hands or head, other person's hands, combs, hair manipulation devices, other parts of a hair cutting device 180, or other possible items that may block a positioning signal) and the associated positioning ranges may be rejected for the purpose of computing the position of positioning sensor 300. Some signals, such as sound signals or ultrasound signals, may propagate around obstructions so that analysis of signal strength at positioning sensor 300 alone may not provide a clear indication that the signal was blocked or partially obstructed. However, such signals may suffer increased attenuation as a function of the distance propagated as they travel around obstructions. Accordingly, analyzing signal strength may factor both signal strength and propagation time into account to determine if the signal was partially blocked and propagation was around an obstruction. In the case of sound, ultrasound, radio frequency, and some other positioning signals, echoes or reflections of those positioning signals may also be analyzed in some embodiments to ensure that an echo or reflected signal is not used for determining positioning ranges and if large echoes or reflections cannot be isolated from the received positioning signal that those associated positioning ranges may be rejected for determining the position of positioning sensor 300.

Rapid changes in positioning signal strength over time may also indicate that a signal has been suddenly obstructed (or that an obstruction has been removed from a signal's path). Accordingly, some embodiments may monitor for changes in signal strength over time and use the indication of a rapid change in signal strength for a given signal that other signals may be favored, at least until a suitable time interval has passed for which a signal has demonstrated sufficiently stable signal strength.

Other criteria for selecting positioning ranges for computation of the position of positioning sensor 300 may involve what ranges were used most recently. Since errors in the precise positions of positioning interfaces and in the positioning ranges may result in a difference in the computed position of positioning sensor 300, and various hair styles may not show visible problems if there are minor length variations which appear to be smooth and non-abrupt from one region of user's 102 head to another, some embodiments may be able to use ranges to the same positioning interfaces as were used for prior computations. Hence, some embodiments of automated hair cutting systems may use positioning ranges that were used for prior computations when the position of a hair cutting device was in a nearby region of a user's 102 head. As a hair cutting device is maneuvered around the head of a user 102, the positioning ranges used must be changed at some point. In some embodiments, changing the points at which positioning ranges may occur in regions of user's 102 head where small differences in hair length may be less noticeable, where computed differences between positions computed with an old or new set of positioning ranges are small, or where other criteria that may be used in various embodiments indicate that a change in the positioning ranges used is acceptable. Hair may be cut in a somewhat random fashion over defined intervals of length to create a feathered effect in hair for some regions of some hair styles. For some such styles, minor differences in hair length may go unnoticed due to the feathered nature of the hair, making such regions potentially suitable places to hide small position computation errors due to positioning range changes.

Once the position of a positioning sensor 300 is determined, the distance from that positioning sensor to the other positioning sensors on a hair cutting device may be used to determine the position of other positioning sensors. In one embodiment, if positioning sensor 300 was the same positioning sensor as first positioning sensor 184 shown in FIG. 1, then the distances between first positioning sensor 184 and second positioning sensor 185 could be used as a known positioning range to help determine the position of positioning sensor 185. With the position of positioning sensor 184 already computed, two or three additional positioning ranges from positioning sensor 185 to different positioning interfaces may be used to compute the position of second positioning sensor 185. And once the position of second positioning sensor 185 is known, the distance from both first positioning sensor 184 and second positioning sensor 185 may be used along with one or two positioning ranges from different positioning interfaces to compute the position of third positioning sensor 186. The known positions of first positioning sensor 184, second positioning sensor 185, and third positioning sensor 186 may fully define the position and orientation of hair cutting device 180 relative to positioning device 101. Additional positioning ranges to first positioning sensor 184, second positioning sensor 185, third positioning sensor 186, and fourth positioning sensor 187 from the various positioning interfaces may be used as a redundant check to ensure the position and orientation of hair cutting device 180 is known. And for some embodiments, these additional positioning ranges may be used to finalize the position and orientation of hair cutting device 180 if the embodiment is such that the use of ranges and computations as noted above does not fully determine the position and orientation of hair cutting device 180.

Additional information may be used to determine the position and orientation of hair cutting device 180. For example, past information about the position and orientation, and also possibly the velocity and acceleration of hair cutting device 180 may be used along with positioning ranges in order to better compute the position and orientation of hair cutting device 180 (this may be done, for example, with a Kalman filter or other suitable algorithm). Information from accelerometers, gyroscopes, camera images, and other possible sensors may also be used. And, as noted, positioning ranges may be measured, evaluated to determine how likely they are to be accurate, and decisions may be made to determine which positioning ranges to utilize for position and orientation computations. And, additionally, while hair cutting device 180 has four positioning sensors and positioning device 101 has eight positioning interfaces, embodiments of hair cutting devices and positioning devices may contain more or fewer positioning sensors and positioning interfaces.

Positioning signal propagation speed may vary with environmental factors. For example, if ultrasound signals are used for positioning signals, the propagation speed may vary with temperature, humidity, air density, and other factors. For embodiments utilizing positioning signals that have propagation speeds that vary with environmental factors, some embodiments of positioning devices 101 may allow the actual propagation times between some positioning interfaces with known spacing to be measured directly. For example, left second positioning interface 130*b* and left third positioning interface 130*c* may be substantially and sufficiently rigidly supported by left side frame 112 that the distance between them is known and substantially constant over time and environmental changes (i.e. changes in temperature, humidity, etc.). If left second positioning interface 130*b* emits an ultrasound positioning signal that is sensed and received by left third positioning interface 130*c*, then the propagation time of this ultrasound positioning signal over the known distance from left second positioning interface 130*b* to left third positioning interface 130*c* may be used to calculate the propagation speed of ultrasound signals for the temperature, humidity, air density, and other factors present for the specific time and place that positioning device 101 is being used so that accurate knowledge of the positioning signal propagation speed may be used for associated computations. Such an embodiment of positioning device 101 requires at least one positioning interface to be capable of receiving and processing a positioning signal (for embodiments in which the positioning interfaces of positioning device 101 normally only transmit positioning signals, in the case of embodiments in which the positioning interfaces of positioning device 101 normally only receive positioning signals, then at least one positioning interface must be capable of transmitting a positioning signal). Substantially equivalently, signal propagation speed measurements may also be undertaken between positioning sensors on hair cutting device 180 that are a known distance apart.

Greater accuracy may be obtained in some embodiments if multiple measurements of propagation times between multiple (three or more) transducers (that is, between multiple positioning interfaces or sensors on either on a positioning device or a hair cutting device) that are at different known distances from each other are undertaken, as it allows both a slope and offset to be determined for propagation time as a function of transducer spacing. For signals that travel very fast, such as light signals, e.g., using multiple known ranges for determining signal propagation speed allows fixed time delays due to delays in positioning signal generation and received signal processing electronics to be mathematically determined and subtracted out. By using multiple known ranges, signal propagation speed may be determined based on a determined slope that relates measured propagation time to known propagation distance so that fixed offset delay times do not factor into determining signal propagation speed.

Other embodiments of automated hair cutting systems may make measurements of environmental parameters (such as temperature, humidity, air density, etc.) and apply known compensations based on the measured values so that a propagation speed of positioning signals may be determined without directly measuring it.

Figure 4:
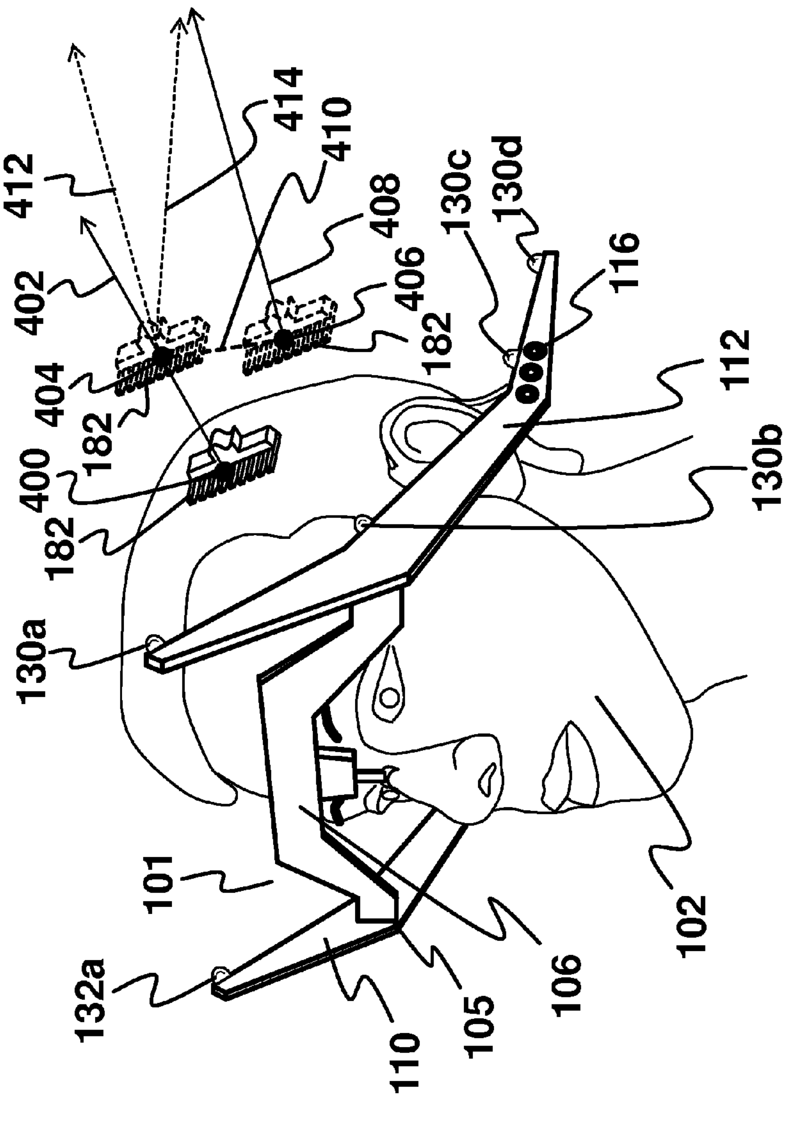
FIG. 4 is an environmental view of one embodiment of a cutter head according to the present disclosure, shown in multiple possible positions.

After determining the position and orientation of hair cutting device 180 relative to positioning device 101, the position of the cutter head 182 of hair cutting device 180 may be computed. In FIG. 4, a user 102 wearing positioning device 101 is shown along with cutter head 182. A first position 400 shows the position of the center of cutter head 182. First position 400 is shown in FIG. 4 as a black dot substantially in the center of cutter head 182. In FIG. 4, only the cutter head 182 and a small portion of the structure of hair cutting device 180 supporting cutter head 182 is shown so that the FIG. is not needlessly cluttered. In some embodiments of automated hair cutting systems, the position of the center of cutter head 182 may be used to represent the position of cutter head 182 for purposes of determining where hair on the scalp of user 102 has been collected (as is shown for first position 400 in FIG. 4) and for determining the length to which the collected hair has been extended (so that the decision of when to cut hair is based on the position of the center of cutter head 182). Other embodiments may utilize computations that account for the shape and outline of cutter head 182 and both the orientation and position of hair cutting device 180 so that all hair collected in cutter head 182 is accounted for so that as hair is extended and slides through cutter head 182 that no hair is cut too short (and while some hair may be cut a bit longer than may be desired, assuming all knives of cutter head 182 actuate together at the same time, it is possible with additional cycles of collecting and extending hair to cut hair that was left a bit too long a second time on a subsequent cycle of collection and extension of hair).

Cutter head 182 may be used to collect and extend hair for cutting the hair to a desired length. Positioning device 101 may be used for determining the position of cutter head 182 on the head. The time at which an automated hair cutting system should consider hair collected in cutter head 182 may be signaled by a button press or other signal from user 102 (or other person operating the system), automatically through analysis of the position and orientation of hair cutting device 180, through observation of a touch sensor on the base of cutter head 182 that may make mechanical contact to the head of user 102 or sense the head of user 102 in other ways (see prior art), or through other possible mechanisms. Some embodiments of positioning device 101 and hair cutting device 180 (and possibly other elements of an automated hair cutting system) may only provide moderate accuracy for the position on the scalp of user 102 at which hair is collected in cutter head 182. However, as hair is extended for cutting, the position of cutter head 182 at which hair was collected may be used as a reference position, so that the positions of cutter head 182 as hair is extended for cutting may reference the position at which hair was collected and use the difference between the present position of cutter head 182 relative to the starting position of cutter head 182 for determining the length to which hair has been extended. Using the starting computed position of cutter head 182 at which hair was collected as a reference position as described here above may allow the length to which hair is extended to be better computed than may otherwise be possible since many errors in the absolute position of cutter head 182 may be subtracted out through such a differential hair measurement technique (the term "differential hair measurement technique" will be used to describe the method explained above of using the position at which hair was collected in cutter head 182 before it was extended as a reference position from which future positions of cutter head 182 may be subtracted as part of a computation to compute the length of hair being extended in cutter head 182).

In the course of using a differential hair measurement technique, as described in the paragraph above, inaccuracies in the computed position of cutter head 182 will be less problematic if the same positioning ranges are used for the computation of the length to which hair has been extended through the entire course of extending hair for cutting. That is, the anticipated inaccuracies in the length of positioning ranges, the precise position of positioning interfaces, the precise position of positioning sensors, and other factors leading to inaccuracy may be largely subtracted out of the computation of the length to which collected hair has been extended if the same positioning ranges are used through the course of the extension of hair for cutting. Subsequent sequences of collecting hair may make use of different positioning ranges for position computations as cutter head 182 is manipulated to different positions on the scalp of user 102, but once hair is collected, the same positioning ranges may be used throughout the selected extension of hair.

Referring now to FIG. 4, there is shown various positioning ranges and positions for cutter head 182 determined according to the present disclosure. While some embodiments may utilize positioning ranges computed during hair collection, other embodiments may need to account for and compute changing positions of cutter head due to obstructions, variations in positioning devices and/or hair cutting devices, and the like. Where there are obstructions, for example, an automated hair cutting system utilizing positioning device 101 and hair cutting device 180 may need to drop some or all of the positioning ranges and adopt other positioning ranges for positioning computations. As new positioning ranges are used, some differences in the computed position of cutter head 182 may be anticipated. In FIG. 4, cutter head 182 is shown against the scalp of user 102 at first position 400. While no hair is shown in cutter head 182 in FIG. 4, in first position 400 cutter head 182 may have collected hair and may be ready for extension of hair for cutting. From first position 400, cutter head 182 may be extended along first trajectory 402 to second position 404 at which point a change may be made in the positioning ranges used to compute the position of cutter head 182 (cutter head 182 is shown at second position 404). The newly computed position of cutter head 182 utilizing the new positioning ranges may appear at third position 406. An offset error 410 is shown as a dashed line in FIG. 4 and offset error 410 is simply the difference between third position 406 and second position 404 computed through subtraction in three dimensions (cutter head 182 is shown at third position 406). That is, offset error 410 is not a single number, but an ordered triplet that provides the offset error dimensions in all three coordinate axes (when using an orthogonal coordinate system such as the one show in FIG. 2).

While computed second position 404 is shown as a desired position of cutter head 182 and offset error 410 represents the error that occurs when positioning ranges used for computations are changed resulting in cutter head 182 computed to be at third position 406, other positions and error values may occur in conjunction with use of the positioning device 101. Likewise, only one cutter head 182 is shown, but other embodiments may comprise multiple cutting heads. Compensations may be determined and made to the computed positions of cutter head 182 so a desirable haircut may be achieved in spite of uncompensated position computations that may not precisely agree if different positioning ranges are used to compute them.

As shown in FIG. 4, first trajectory 402 shows the direction of movement for cutter head 182 while hair was extended for cutting while the original positioning ranges that were established when hair was collected were used for position computations. New positioning ranges are then adopted when cutter head 182 is extended to second position 404, which results in a different computed third position 406 for cutter head 182. Offset error 410 is the three dimensional difference computed by subtracting third position 406 from second position 404. Second trajectory 408 represents the computed trajectory that cutter head 182 will follow if further extended from third position 406 without compensation of its computed positions. As shown in FIG. 4, substantial differences may exist between first trajectory 402 and second trajectory 408 that may result in large differences in the length to which hair is cut, possibly resulting in an undesirable result for a haircut. In some embodiments, the size of offset error 410 may be evaluated and, if offset error 410 is determined to be large enough that unacceptable results may occur (i.e. hair may be cut to an unacceptable length), the automated hair cutting system may abort the cycle of hair extension and signal to user 102 to try another attempt to collect and extend hair for cutting (or possibly take other action or additional actions such as coaching user 102 to extend their hair for cutting in a somewhat different direction that may result in better positioning computation accuracy).

In some embodiments, second trajectory 408 may be compensated using offset error 410. Through addition of offset error 410 in three dimensions to second trajectory 408, second trajectory 408 may be translated to produce third trajectory 412. While third trajectory 412 may not, in general, follow the original desired first trajectory 402, third trajectory 412 may offer substantially smaller differences in computed positions of cutter head 182 than was provided by trajectory 408. In addition, the differences between first trajectory 402 and third trajectory 412 begin at substantially zero at second position 404 and accrue in a gradual fashion as cutter head 182 is further extended. Hence, compensation of errors due to the adoption of new positioning ranges in the course of extension of hair may be compensated to effect by computation of an offset error 410 at the point at which new positioning ranges are adopted and adding the offset error 410 to future computed positions. In the case of multiple changes in which new positioning ranges are adopted at multiple times in the course of extension of hair, multiple offset errors (one at each position in which the positioning ranges used are changed) may be computed and applied. Other aspects of sensing and computation of the position of cutter head 182 may be also compensated in a similar fashion if other new sensors, computations, adjustments, or other aspects of position computations are introduced or taken out of use in the course of extension of hair. For example, if use of an accelerometer reading is introduced for position computation in the course of hair extension the effect of the accelerometer may similarly be compensated so that the new computed trajectory matches the old trajectory at the point of introduction of the accelerometer reading and that differences then accrue in a gradual manner.

Compensation using offset error 410 as described above is only one possible compensation technique for changes in how positions are computed in the course of extension of hair for cutting (whether the change be due to use of new positioning ranges or other changes). For example, if offset error 410 is used for a translational compensation of second trajectory 408 to produce third trajectory 412, it is also possible to gradually reduce the amount of translational computation that is used so that trajectory third 412 eventually merges with second trajectory 408. Fourth trajectory 414 as shown in FIG. 4 provides an example in which the translational compensation of second trajectory 408 is reduced from offset error 410 in a gradual fashion as a function of the computed distance of any point along second trajectory 408 to third position 406 (the point at which the positioning ranges used were changed and cutter head 182 position was computed to be at third position 406). Gradually reducing the level of translational compensation used for compensating trajectories may be done over a fixed dimension, such as a fixed number of millimeters, centimeters, or inches, etc., or may be done as a percentage of the length to which hair is being cut, the maximum length hair is being cut to for a given hair style, a percentage of a dimension of a user's 102 head (i.e. half the width of a user's head, etc.), or other possible dimensions or schemes for reducing the level of compensation used. Compensations may also be reduced in non-linear fashions, and compensations need not be limited to translational compensations. A wide variety of mathematical compensation schemes are possible and may also be used in conjunction with the present disclosure.

Compensations may be made for inaccuracies in the computation of the orientation of a hair cutting device 180 that may occur when the positioning ranges or other inputs that are used in the computation of orientation are changed. The results of orientation computations before and after positioning ranges or other inputs are changed may be compared and rotational compensations may be applied so that the computed orientation of a hair cutting device does not change abruptly, but instead changes in a gradual fashion. Rotational compensations of orientation may be used in conjunction with translational compensations of position in some embodiments. And in some embodiments, compensation of orientation prior to compensation of position may be preferred as changes in hair cutting device 180 orientation may also affect the computed position of hair cutting device 180 and, hence cutter head 182. A wide range of mathematical techniques may be used to provide compensation of computed orientation and/or position for a wide range of embodiments of automated hair cutting systems.

The embodiment shown in FIG. 4 provides a method to compensate position and/or orientation computations if positioning ranges or other factors are changed while a hair cutting device is being extended after hair has been collected. However, as a hair cutting device 180 and its cutter head 182 are being moved about the head of a user 102, positioning ranges used to compute the position of cutter head 182 at points at which hair is being collected (before it is extended) may also differ depending on the position of cutter head 182. And so, as cutter head 182 is moved from place to place over the scalp of a user 102, abrupt changes in the computed position of cutter head 182 may occur as the positioning ranges (or other factors used for position and/or orientation computations) are changed.

Figure 5:
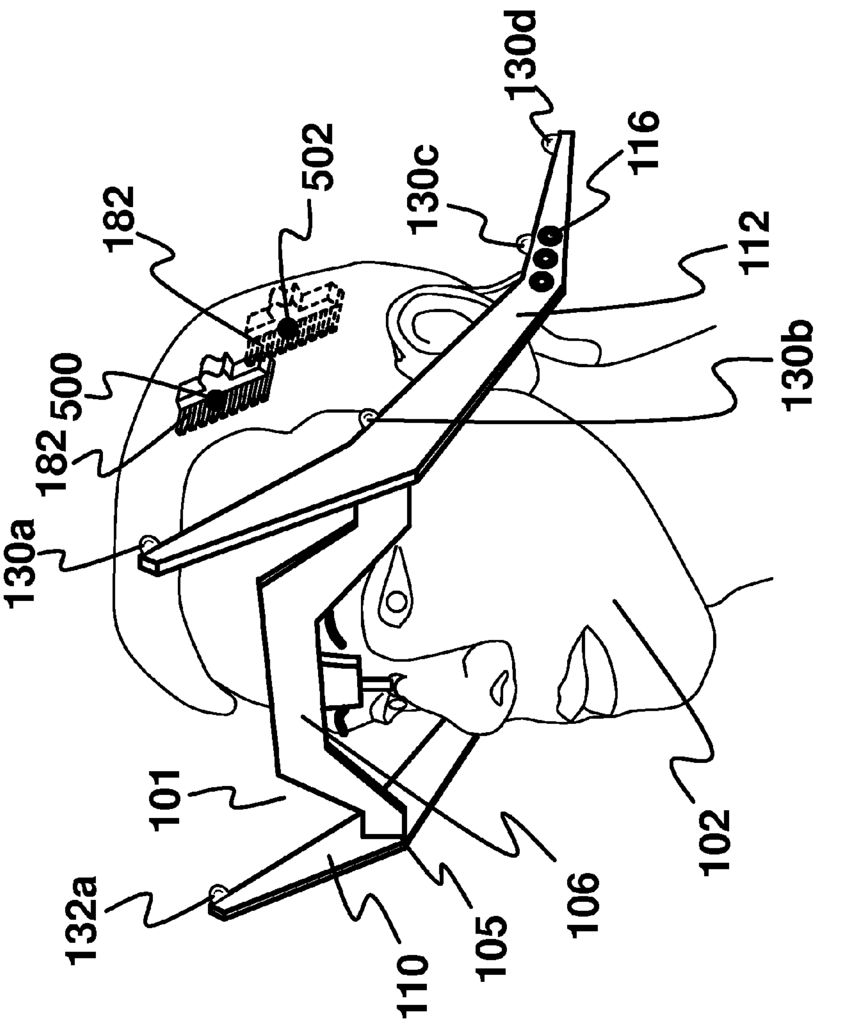
FIG. 5 is another perspective view of the cutter head of FIG. 4, illustrating another aspect of positioning the cutter head according to the present disclosure.

Referring now to FIG. 5, there is shown a user 102 wearing positioning device 101 and cutter head 182 at first position 500 where hair may be collected before extended for cutting. If positioning ranges or other factors for positioning computations are changed as the actual position of cutter head 182 is minimally changed, the computed position of cutter head 182 may abruptly change to second position 502, where cutter head 182 is shown in dashed lines. Such abrupt changes in the computed position of where hair is collected may result in errors in how hair is cut, so some embodiments may use compensation of the calculations to determine the position at which hair is collected. If only a substantially minimal movement of cutter head 182 occurred when computing second position 502, a translational computation of the second computed position 502 may be determined by subtracting second position 502 from first position 500 (in three dimensions). This translational compensation may then be added to second position 502 to translate the computed position of cutter head 182 back to first position 500 so that no abrupt change in computed hair collection position occurs when the positioning ranges used for position computation are changed. And, this translational compensation may be applied consistently during use of the new positioning ranges or the amount of translational compensation may be gradually reduced as cutter head 182 is moved over the surface of the scalp of user 102 (and the method for gradually reducing the amount of compensation may be a function of absolute dimensions, relative dimensions, and may be varied with various hair styles or even for various regions of a user's 102 scalp depending on the hair style being used). Other methods of smoothing, compensating, interpolating, averaging, adjusting, or otherwise accommodating for abrupt changes in computed hair collection position due to changes in which positioning ranges are used (or other factors) are also possible. For example, some embodiments of automated hair cutting systems may map the scalp of a user 102 in three dimensions and compute compensations for some or all regions of the scalp map as a function of which positioning ranges are used. Other embodiments may employ a scheme in which multiple sets of positioning ranges are used for position computations and results are averaged so that the effect of adding new positioning ranges or taking away others as cutter head 182 is moved over a user's 102 scalp are minimized. And still other embodiments of automated hair cutting systems may use favored positioning ranges for various regions of a user's scalp that are determined before hair cutting begins and employ pre-determined position compensation schemes for when transitions are made by cutter head 182 from one such region to another. A wide variety of methods are possible for compensation of the computations used for computing the position at which hair is collected.

There are many approaches for compensating for abrupt changes in computed positions of cutter head 182. In certain embodiments, these approaches may involve accepting a certain level of inaccuracy and using the fact that many haircuts will look fine so long as moderate or small errors in computed position don't result in hair cutting errors that are not significantly visible in a resulting haircut. However, there are features in some hair styles where hair length may change abruptly at substantially precise locations on a scalp. For example, hair may be cut to a substantially different length on either side of a hair part. Other styles might involve cutting hair to abruptly different lengths around a line, point, shape, or other feature on a scalp, and other hair styles may involve cutting decorative patterns or even alphabetic letters into hair. In such cases, accuracy around such a feature by performing calibrations of computed positions of cutter head 182 may ensure a more accurate haircut. Taking the example of a hair part, a user or other person operating hair cutting device 180 may be directed by an automated hair cutting system to comb the hair to form a part at the desired position on their scalp and to then insert the front tips of cutter head 182 into the part and provide a signal (such as a button press, verbal signal, or other signal) to the hair cutting device that the front tips of cutter head 182 are so positioned. This may be repeated at multiple positions along the hair part so that the desired position of the hair part is mapped. The automated hair cutting system may use a preferred set of positioning ranges to compute the position of the front tips of cutter head 182 along the hair part and may use compensations to compensate any effects of changes in computed positions if different positioning ranges must be used at various locations along the hair part. Once the hair part is mapped, the user may be prompted to begin cutting hair while manipulating hair cutting device 180 to apply it using similar orientations to those used when the hair part was mapped so that the same positioning ranges may be applied for positioning computations along the hair part and the same compensations may be used so that when hair is cut in close proximity to the hair part that substantially the same positioning ranges and compensations may be applied as were used to map the hair part. As hair cutting device is moved away from the hair part to cut hair nearby, additional compensations may be applied as described above so that hair tapers in length smoothly on both sides of the hair part in a desirably way. Similarly, other shapes and features may be similarly mapped and cut into hair.

While the examples of embodiments provided in this patent application apply to cutting hair, the techniques of automated hair cutting systems may be applied to embodiments of systems used for shaving facial hair, applying makeup, applying facial paint, or other uses; and the techniques taught in this patent application may be applied to some of these embodiments.

Positioning systems for use with automated hair cutting systems may utilize multiple positioning ranges to determine the position and/or orientation of a hair cutting device relative to the head of a user receiving a haircut, including embodiments wherein a selection criteria is used to apply certain positioning ranges. A selection criteria for selecting positioning ranges may include analysis of positioning signal strength, the subtended angle of multiple positioning ranges that may be used in conjunction, the sensitivity of a computed position to small errors in the measurement of positioning ranges, the likelihood that a given positioning range may be obstructed, past use of positioning ranges for determining position and/or orientation of a hair cutting device relative to the head of a user, and other factors. Some automated hair cutting systems may have the capabilities to change the positioning ranges used for determining position and/or orientation of a hair cutting device during use to compensate for variations or inaccuracies in positioning ranges. Variations in positioning ranges may lead to differences in the computed position and/or orientation of a hair cutting device relative to the head of a user before and after some or all of the positioning ranges used are changed. Computation and application of a translational offset may be applied when determining position and/or orientation of a hair cutting device, or changes thereto, and may also include other mathematical computations.

Those skilled in the art to which the present disclosure relates will appreciate that other and further additions, deletions, substitutions and modifications may be made to the described embodiments.

The invention claimed is:

1. A positioning system, for use with a hair cutting system, comprising:

a frame configured to rest on a head of a user;

a plurality of frame supports secured to the frame, the plurality of frame supports are configured to removably engage with a part of the head of the user, which secures the frame on the head of the user;

a plurality of positioning interfaces positioned along said frame; and a moveable component comprising at least one sensor;

wherein the plurality of positioning interfaces communicates with the at least one sensor to determine a plurality of positioning ranges;

wherein said plurality of positioning ranges are used to at least partially compute a position of the moveable component relative to the frame; and wherein said position of the moveable component is used at least partially to cut or manipulate hair.

2. The positioning system according to claim 1, wherein at least one of said plurality of positioning ranges is determined by measuring the time of flight of a signal propagating between each of said plurality of positioning interfaces and said at least one sensor.

3. The positioning system according to claim 1, wherein at least one of said positioning ranges is determined by measuring the signal strength of a signal propagating between each of said plurality of positioning interfaces and said at least one sensor.

4. The positioning system according to claim 1, wherein a selection criteria is used to select a subset of said plurality of positioning ranges, said subset used to compute the position of said moveable component relative to said frame.

5. The positioning system according to claim 1, wherein each positioning interface comprises at least one of a speaker, a microphone, a transducer, an antenna, a light, a photo-sensor, and a camera.

6. The positioning system according to claim 1, wherein said at least one sensor comprises at least one of a speaker, a microphone, a transducer, an antenna, a light, a photo-sensor, and a camera.

7. The positioning system according to claim 4, wherein said selection criteria uses at least one of the following factors: current signal strength measurement, previous signal strength measurements, subtending angle of positioning ranges, previous positioning ranges used, and previous calculated positions of said moveable component.

8. A method for dynamically positioning a moveable component of a hair cutting system, the method comprising:

providing a positioning system comprising:

a frame configured to rest on a head of a user;

a plurality of frame supports secured to the frame, said plurality of frame supports configured to removably engage with a part of the head of the user, which secures the frame on the head of the user;

a plurality of positioning interfaces positioned along said frame;

at least one sensor attached to the moveable component;

engaging at least one of the plurality of frame supports to a part of the head of the user;

interfacing the plurality of positioning interfaces with the at least one sensor;

establishing an origin position of said at least one sensor relative to said frame;

computing a plurality of positioning ranges between said plurality of positioning interfaces on said frame and said at least one sensor; and selecting at least two of said plurality of positioning ranges for determining one or more positions of said at least one sensor as said moveable component moves relative to said frame;

wherein said moveable component is used to cut or manipulate hair.

9. The method according to claim 8, wherein said selecting at least two of said plurality of positioning ranges comprises analyzing positioning signal strength between said plurality of positioning interfaces and said at least one positioning sensor.

10. The method according to claim 8, wherein said selecting at least two of said plurality of positioning ranges comprises computing a translational offset according to a most recent position of said moveable component.

11. The method according to claim 8, wherein said selecting at least two of said plurality of positioning ranges comprises analysis of signal propagation times of signals from said at least one sensor to one or more of said positioning interfaces.

12. The method according to claim 11, wherein said signals are selected from the group consisting of ultrasound signals, sound signals, infrared light signals, sonar signals, microwave signals, radio frequency signals, and radar signals.

13. The method according to claim 8, wherein establishing an origin position of said at least one sensor and moveable component includes using a known position of said moveable component relative to a head on which said frame is placed.

14. The method according to claim 8, further comprising determining a position of said frame relative to a user's head on which said frame is placed.

15. The method according to claim 8, wherein said moveable component of said hair cutting system comprises a cutting device having at least one cutting head positioned on a distal end thereof relative to an object holding said cutting device.

16. A positioning system, for use with a hair cutting system comprising:

a frame configured to rest on a head of a user;

a plurality of frame supports secured to the frame, the plurality of frame supports are configured to removably engage with a part of the head of the user, which secures the frame on the head of the user; and a plurality of positioning interfaces positioned along said frame; and a moveable component comprising at least one sensor, said moveable component configured to cut or manipulate hair;

wherein the plurality of positioning interfaces communicate with the at least one sensor to determine a plurality of positioning ranges;

wherein a first subset of said plurality of positioning ranges are used to at least partially determine a first position of the at least one sensor;

wherein a second subset of said plurality of positioning ranges are used to at least partially determine a second position of the at least one sensor;

wherein the first subset and the second subset of said plurality of positioning ranges are different; and, wherein the first position and the second position of the at least one sensor are different.

17. The system according to claim 16, wherein said system is further configured to calibrate a position of said frame relative to a user's head on which said frame is placed.

18. The system according to claim 16, wherein said system is configured to select a subset of said plurality of positioning ranges by analyzing signal strength between said plurality of positioning interfaces and said at least one sensor.

19. The system according to claim 16, wherein said system is configured to select a subset of said plurality of positioning ranges by computing a translational offset according to a most recent position of said moveable component.

20. The system according to claim 16, wherein said system is configured to select a subset of said plurality of positioning ranges by analyzing signal propagation times of signals from said at least one sensor to one or more of said positioning interfaces.

* * * * *